UNITED STATES PATENT OFFICE.

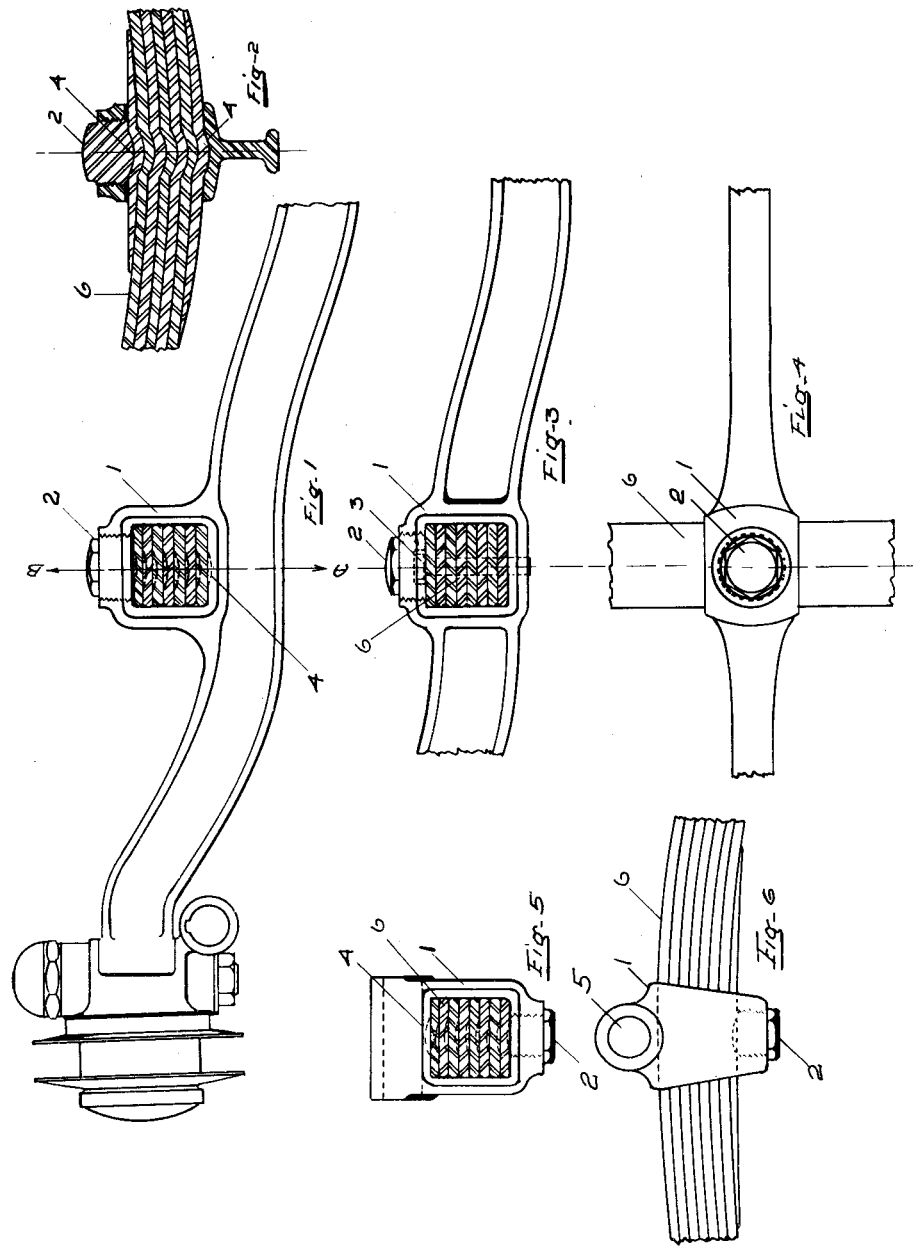

VICTOR LEE EMERSON, OF ALEXANDRIA, VIRGINIA, ASSIGNOR TO THE EMERSON ENGINEERING COMPANY, A CORPORATION OF DELAWARE.

SPRING-MOUNT.

1,185,643.      Specification of Letters Patent.      Patented June 6, 1916.

Application filed January 26, 1915. Serial No. 4,520.

*To all whom it may concern:*

Be it known that I, VICTOR LEE EMERSON, a citizen of the United States, residing at Alexandria, State of Virginia, have invented certain new and useful Improvements in Spring-Mounts, of which the following is a specification.

My invention relates to spring mounts and has as an object the production of a more secure means of attaching a spring to an axle or other holder than by the usual means of clips, which depend upon a nut at each end to hold them and the spring in place.

Another object is to provide a comparatively narrow spring pad, so that the action of the spring will have a free movement and at the same time be rigid against distorting forces, which twist the ordinary clips.

A further object is to prevent the spring from moving endwise on its seat, by clamping it in position by a large diameter set screw, whereby a greater clamping force can be brought to bear on the spring, in the allotted space, than with small nuts and clips, and to make it possible to mount the spring near the central section of the axle or between the upper and lower lines of said axle so as to give the frame mounted upon the same greater clearance of travel and a lower center of gravity.

Another object is to provide a means whereby the spring plates may be held in the desired position relative to each other without cutting a section through the same to receive the usual form of bolt.

Figure 1 represents one end of an axle showing a cross section of the spring, mounted on top of the I-beam and the means of securing the same. Fig. 2 is a section through the axle and spring on line A—B. Fig. 3 shows a portion of an axle and a section of the spring, the casing or receptacle of the spring being formed practically in line with the I-beam, with a bolt passing through the center of the spring. Fig. 4 is a plan view of a portion of an axle and spring showing the clamp screw. Figs. 5 and 6 show different views of a spring mount working on a pivot.

At a suitable place on the axle a section, indicated at 1, is formed and a mortise of a size made therein suitable to receive the spring. A large diameter set screw, shown at 2 is threaded into the section, in such a manner, that it may be screwed down to clamp said spring. One form of set screw has a circular point, that fits in a depression of a circular shape 4 in spring 6, and a counter bore of similar shape in the axle, receives the bottom of the spring, so that the plates may register, one depression with the other, and be locked against end movement at this point. This construction obviates the weakening of the spring when the usual method of boring a hole through the same is employed.

A bolt of the usual construction is shown at 3 in conjunction with the novel form of spring mount, where it is desirable to employ the usual type of spring, in which case, the set screw has a hollow point to fit over the top of the bolt head, so that the edges of the set screw may rest on the spring. The bolt is inserted in this construction, before the set screw is put in place. It is preferable to have this form of mount forged integral with the axle, but it may be made separate and mounted on a pivot, as shown on 5, or secured to the axle or chassis by other means, without departing from the spirit of this invention, and can be modified in form and relation to the axle.

Having described my invention what I claim is:

1. In a device of the character described, in combination, an axle, a casing formed integral therewith, a spring passing freely through said casing, means in said casing to lock said spring therein.

2. In a device of the character described, in combination, an axle, a casing formed integral therewith and located between the top and bottom lines of said axle, a spring passing freely through said casing and held therein by means located in said casing.

In testimony whereof I affix my signature in presence of two witnesses.

VICTOR LEE EMERSON.

Witnesses:
    F. L. SLAYMAKER,
    A. E. EMERSON.